April 1, 1930.                    A. J. BAIRD                    1,752,548
REGULATING APPARATUS FOR OIL BURNERS Original Filed Oct. 27, 1927

INVENTOR;
ARTHUR J. BAIRD.
BY
ATTORNEY.

Patented Apr. 1, 1930

1,752,548

UNITED STATES PATENT OFFICE

ARTHUR J. BAIRD, OF PORTLAND, OREGON, ASSIGNOR, BY DIRECT AND MESNE ASSIGNMENTS, TO BAIRD AUTOMATIC PRE-HEATER CO., A CORPORATION OF OREGON

REGULATING APPARATUS FOR OIL BURNERS

Application filed October 27, 1927, Serial No. 229,149. Renewed August 24, 1929.

The principal object of my invention is to facilitate the lighting of an oil fire and hasten the attainment of the operating stage of efficient combustion.

A second object is to supply the heat required for this apparatus from either the boiler, in connection with which it is used, or an electric heating element.

A third object is to provide automatic means for shutting off the electric heating element when steam is available from the boiler.

Other objects and advantages of my invention, and objects relating to details of construction and arrangement of parts, will be readily apparent in the course of the detailed description to follow.

The accompanying drawings illustrate by way of example a preferred form of my invention, in which.

Figure 2:
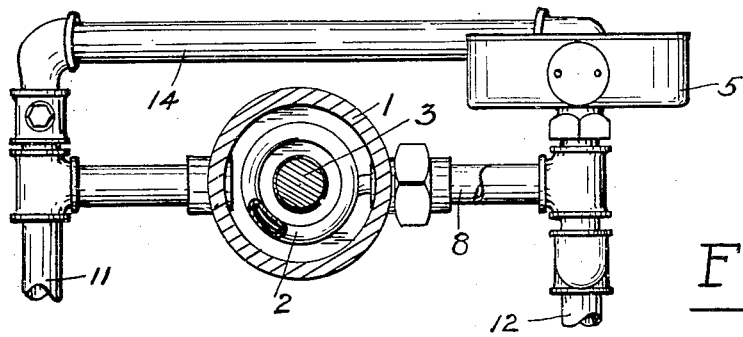
Fig. 2 is a view in horizontal section on line 2—2 of Fig. 1.
Figure 1:
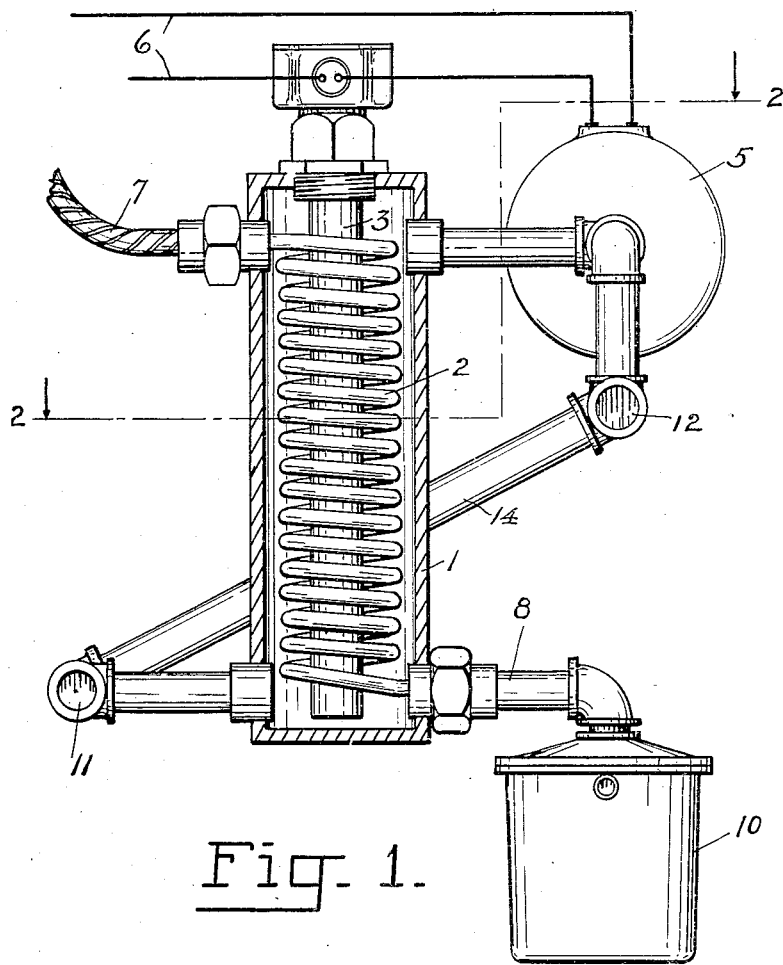
Figure 1 is a view in vertical section of apparatus embodying my invention.

Referring to said views, the reference numeral 1 indicates a cylindrical casing having a closed oil chamber in which are disposed a steam heating coil 2, and an electric heating element 3 of the immersion type. A thermostatic circuit breaker 5 is connected electrically in series with the heating element 3 through conducting wires 6.

A steam pipe 7 supplies steam to the coil 2 where it gives up its heat and is condensed. The condensation is drained off through a pipe 8 and conducted into a steam trap 10 from where it is exhausted. This trap 10 is controlled by a thermostatic element to provide for the escape of air as well as water, in a well-known manner. An oil supply pipe 11 connects the oil pump, not shown, with the chamber 1. An outlet pipe 12 connects with the oil burner nozzle, not shown. The pipe 14 forms one leg of a thermo-siphon connecting the thermostatic element 5 with the chamber 1.

Considering that the fire is out in the boiler in connection with which this apparatus is used, the manner of operation is as follows:

The lead wires 6 being connected electrically with the switch controlling the oil pump and usual blower apparatus, not shown, the electric heating element 3 becomes operative and heats the fuel oil within the chamber in contact therewith. The heated oil circulates in contact with the thermostatic element 5 through the pipes forming communications between said element 5 and the casing 1.

The thermostatic switch 5 is set to break the electrical current supplying the heating element 3 at some temperature less than the temperature of the steam supplied to the coil 2, as for example at 140 degrees Fahr., at which degree of heat oil is found to atomize at high efficiency.

As soon as steam is generated in the boiler, in connection with which this apparatus is used, steam will be conducted through the pipe 7 to the steam coil 2. Gradually the temperature of the fuel oil in the chamber and circulating in contact with the element of the thermostatic switch 5 is raised to a temperature greater than that at which the thermostatic switch 5 cuts out, as for example 145 degrees Fahr.

It will thus be apparent that the heat necessary to heat the fuel oil will automatically be supplied from the boiler when steam is available, or supplied from the electric heating element when steam is not available. Hence, a supply of heated fuel oil is provided for starting the fire as well as for continuous operation.

The fuel oil thus heated before admission to the fire box of the boiler through the usual burner nozzles is more readily combustible than cold oil and conduces to the stability of a newly started fire before the refractory lining of the fire box becomes hot. In continuous operation the pre-heating of the fuel oil contributes to the efficiency of the oil burner in producing a clean fire.

The destructive impregnation of the refractory lining with carbonaceous deposits from unburned oil thrown about in the fire box during the starting of a fire with cold fuel oil is eliminated.

Having described my invention, what I claim, is:

1. A fuel oil heater for oil burners comprising a casing having a chamber through which the fuel oil passes to the burner nozzle, a steam heating coil in said chamber, a thermostatically controlled switch subject to the temperature of the fuel in said chamber, and an electric heater in said chamber connected electrically in series with said switch.

2. In fuel oil heaters in which a steam coil supplies the heat required during normal operation, an auxiliary electric heating apparatus comprising a heating element immersed in the fuel oil near the steam heater, and a thermostatically controlled switch with which the electric heating element is connected in series, said switch being set to break the electric circuit at a lower temperature than the normal operating temperature of the fuel oil as maintained by the steam heater.

3. A fuel oil heater for oil burners, comprising a chamber through which the fuel oil passes to the burner nozzle, a steam heating coil in said chamber, a thermostatically controlled trap through which the air and water of condensation escape, a thermostatically controlled switch subject to the temperature of the fuel in said chamber, and an electric heater in said chamber connected electrically in series with said switch.

4. In fuel oil heaters in which the fuel oil is heated by a steam coil, a chambered casing in which the oil is pre-heated by a steam-coil, an auxiliary electric heater in said chamber, and a thermostatically controlled switch connected electrically in series with said heater and adjusted to break the circuit at a predetermined temperature.

5. A fuel oil heater for oil burners, comprising a chambered casing, means to supply oil under pressure to said chamber, communicative connections between said chamber and a burner nozzle, a steam heating coil in said chamber, an electric heating element in said chamber, and a thermally controlled switch to break the circuit to said element when the oil in said chamber reaches a predetermined temperature.

ARTHUR J. BAIRD.